July 2, 1935.  F. N. DIKEMAN  2,006,385

ADJUSTABLE OVEN BROILER

Filed July 2, 1932  2 Sheets-Sheet 1

INVENTOR.
Frank N. Dikeman
BY
Myron J. Dikeman
ATTORNEY.

July 2, 1935. F. N. DIKEMAN 2,006,385
ADJUSTABLE OVEN BROILER
Filed July 2, 1932   2 Sheets-Sheet 2
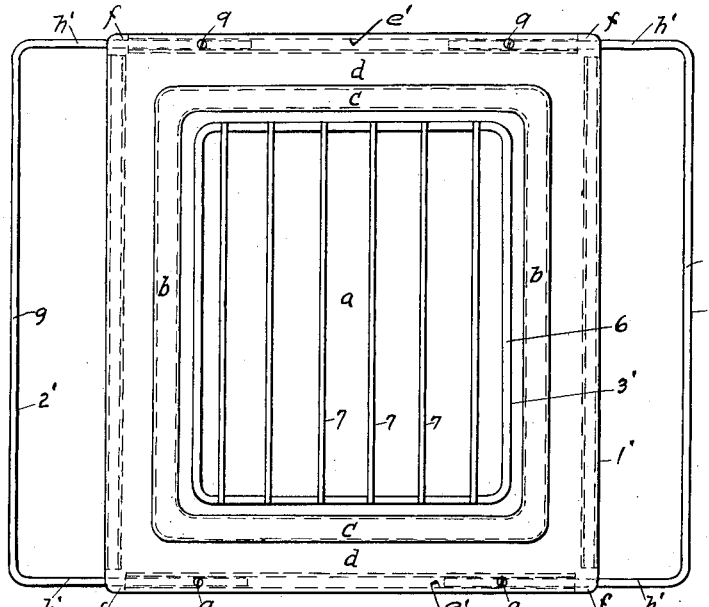
Fig. 5
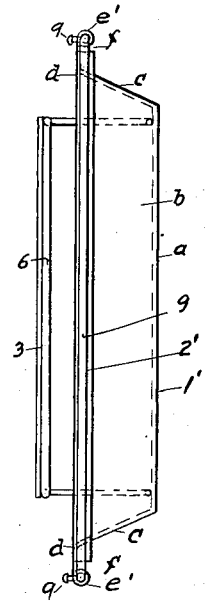
Fig. 6
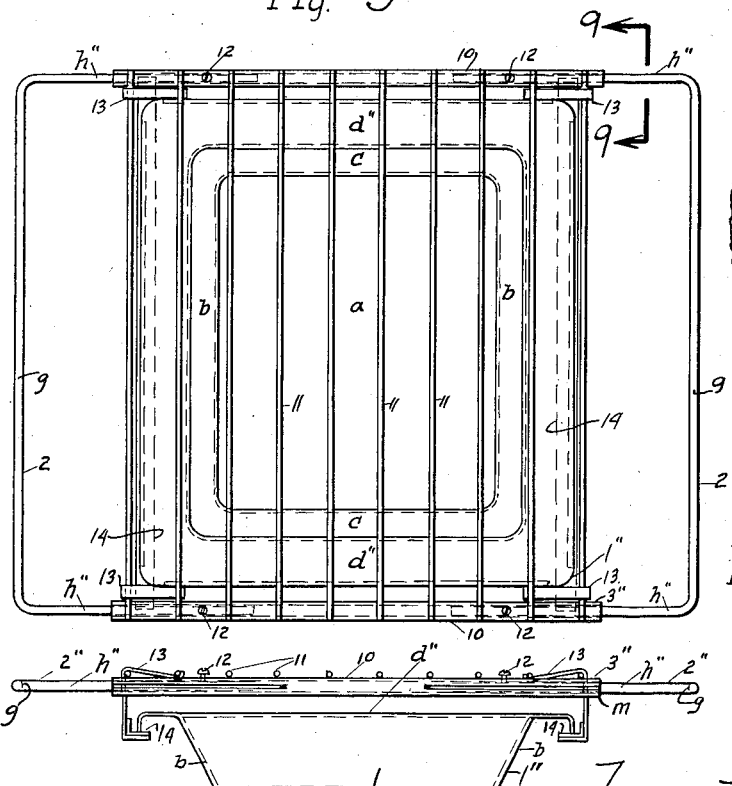
Fig. 7
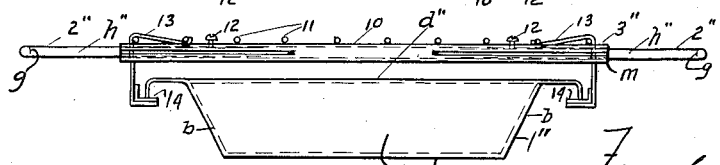
Fig. 8
Fig. 9
INVENTOR.
Frank N Dikeman
BY Myron J Dikeman
ATTORNEY.

Patented July 2, 1935

2,006,385

UNITED STATES PATENT OFFICE 2,006,385

ADJUSTABLE OVEN BROILER

Frank N. Dikeman, Detroit, Mich.

Application July 2, 1932, Serial No. 620,617

11 Claims. (Cl. 53—5)

The object of my invention is to produce an oven broiler adapted for use in any ordinary oven.

Another object is to produce an adjustable broiling unit designed to engage the side wall slides of an oven and supported thereon, said broiling unit being provided with adjustable side supports to fit various width ovens without the use of other mechanical means.

A further object is to produce an adjustable combination broiling pan and grate that is convertible into separate oven units, each capable of being used in the oven independently of the other.

A still further object is to produce a broiling pan that is adjustable in width, designed to fit and engage the oven side wall support slides for support thereon.

Another object is to produce a broiling grate that is adjustable in width, designed to fit and engage the oven side wall support slides of any oven, for support thereon, without other mechanical means.

A further object is to produce an adjustable oven broiling unit that is simple in construction, easily and efficiently operated and that can be manufactured at a very low cost.

These several objects are secured in the preferred form by the construction and arrangement of parts more fully hereinafter set forth.

Similar parts on all drawings are marked by similar numerals or letters.

Fig. 5 is a plan view of a modified form of pan structure, and the relative position of the assembled units.

Fig. 6 is a side view of the modified structure shown in Fig. 5 showing the rolled or tubular pan rim and means for inserting the side support frame rods therein.

Fig. 7 is also a plan view of an alternate form of oven unit, comprising similarly arranged units, but with the adjustable side support frames attached to the broiling grate instead of the pan as previously shown.

Fig. 8 is an end view of the alternate form of oven unit shown in the Fig. 7, showing the relative position of the assembled units and means of supporting the oven pan beneath the grate section.

Fig. 9 is a sectional view taken on the line 9—9 of Fig. 7 showing the tubular structure of the grate end bars for receiving the adjustable side support frame ends therein, and the detail of one of the pan supports.

Figure 1:
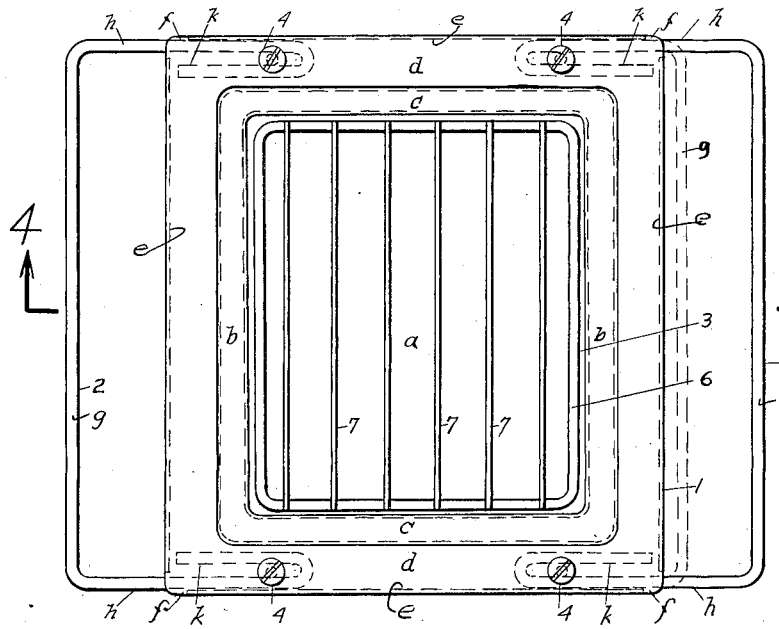
Fig. 1 is a top view of my broiling unit showing the general arrangement of the various assembled parts.
Figure 2:
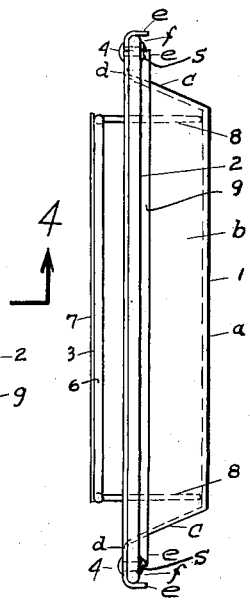
Fig. 2 is a side view of the broiler showing the relative position of the assembled units.
Figure 3:
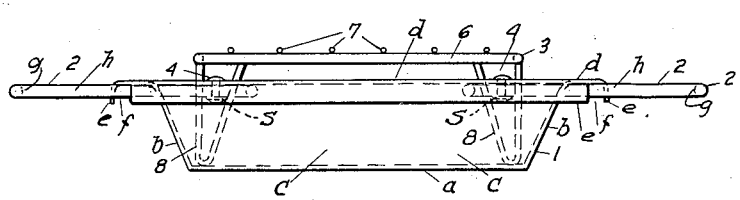
Fig. 3 is an end view of the broiler, showing the extended support side frames and the position of the attaching members.

In general my device comprises an oven unit having two U-shaped adjustable support frames mounted on opposite sides thereof, said support frames being formed with outer parallel edges, and are provided with means for adjustably attaching said frames to the oven unit walls, and capable of expanding or contracting in width of the assembled section for fitting and engaging the side wall support slides of any ordinary oven, regardless of the oven width.

I will now describe more fully the detailed construction of my device, referring to the drawings and the marks thereon.

The oven unit herein described comprises a broiling pan 1, and a broiling grate 3, and is provided with two U-shaped side support frames 2. The broiling pan 1 is made of sheet metal, formed of the ordinary pan construction, rectangular in shape and provided with bottom $a$, and side and end walls $b$ and $c$ preferably positioned sloping outward. The pan is provided with a flat top rim $d$ formed with a turned or rolled outer edge $e$, preferably at approximately right angles to the rim surface, the edges $e$ on all sides are terminated near the rim corners, providing open corners $f$ on all corners of the rim. Through the corner openings $f$ on opposite sides of the pan 1, are inserted the bent ends $h$ of the U-shaped support frames 2. Said support frames 2 are preferably made of bar metal, herein shown as round bar stock, although any other shaped section will do equally as well, said bars being formed with straight center sections $g$ and with the end sections $h$ bent at right angles thereto, the length of the center sections $g$ being just sufficient to position the ends $h$ for entering the openings $f$ of the rim corners and fit along the inner walls of the rolled rim edges $e$ and positioned flat against the lower surface of the rim $d$. The outer ends of the end sections $h$ are each curved and bent back forming U-shaped loops $k$, each positioned parallel to its respective section end and fitted flat against the pan rim surface, said loop ends $k$ being extended to engage the inner face of the side rim edges $e$ when the support frames 2 are expanded to their outer positions. Small stud pins or screw bolts 4 with spring washers s are mounted on the lower surface of the pan rim d, near each rim corner, and positioned to pass through and engage the loop ends of the support frames 2 in a manner to allow said frames to be adjusted sidewise thereon with the center sections g either near the pan rim as indicated by the dotted lines in Fig. 1 or in their expanded positions as indicated by the full lines, or in any other position therebetween. The rim edges e act as frame guides, while the threaded stud pins and spring washers provide means for rigidly and fixedly attaching the frames to the pan rim in any chosen position as may be required to fit the support slides of various size oven walls, the support frames 2 being expanded sufficiently to meet and engage therewith, for supporting the oven unit within the oven.

The broiling grate 3 may be of any grate construction, preferably of small metal rod sections, the outer rim 6 being formed into a rectangular frame and provided with small metal rod cross bars 7 equally spaced thereon and fixedly attached thereto, preferably by welding. The size of the grate frame 6 is preferably smaller than the pan recess and is supported therein by short wire legs 8 securely attached thereto. The grate 3 may be removed from the pan 1 when desired by simply lifting same therefrom. The purpose of the grate is to retain roasts or other meats thereon while cooking in the oven, allowing the heat to reach the meat on all sides and the grease as may drip therefrom fall into the oven pan 1 directly therebeneath.

A modified form of my device is shown in the Figs. 5 and 6 of the drawings, the pan and grate construction being exactly the same as heretofore described except the rim edges e' are formed into full tubular sections as is shown in Fig. 6, and the stud pins 4 are omitted altogether. Also the side frames 2' are bent bar sections but formed with straight end sections h' and which enter and fit tightly within the tubular edges e' and slide lengthwise therein for making the support frame side adjustments. The support frames 2' are retained on the pan rim in fixed positions either by the spring resistance of the slotted tubular walls of the rim or by small set screws 9 threadably mounted in the pan rim. The operation and use of the oven unit is exactly the same as heretofore described.

Figure 4:
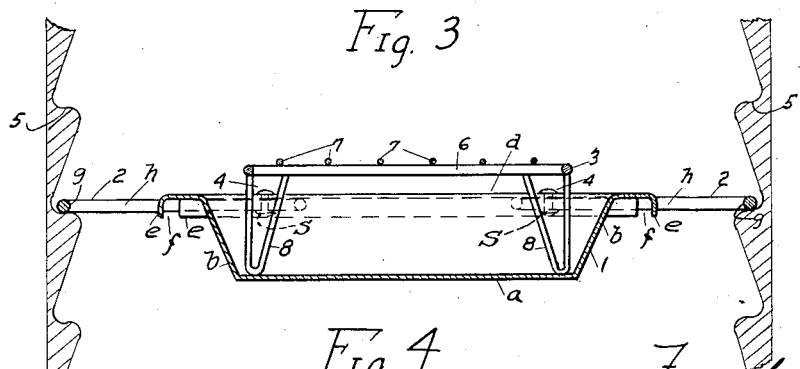
Fig. 4 is a cross sectional view taken on the line 4—4 of Fig. 1 showing the broiling grate and one means for combining the two units together.

Figs. 7, 8 and 9 of the drawings show an alternate form of construction of the oven unit, where the broiler pan and grate remain in the same relative positions, but reversing the adjustable feature of the supporting frames so as to operate from the grate section instead of the pan. The pan 1'' being suspended beneath the grate section 3'' by suitable support members. The grate 3'' is preferably formed of tubular end bars 10, positioned parallel to each other, and are connected together by small grate bars 11 placed thereover and fixedly welded thereto, forming a rectangular grate section. The U-shaped side bar support frames 2'' are formed exactly the same as the frame 2' in Fig. 5 and are slidably mounted on each side of the grate section 3'' by inserting the ends h'' within the open tubular ends of the grate end bars 10, and fixedly retained therein by the spring resistance of the slotted bar walls or by small set screws 12 threadably mounted in the tubular bar walls. The support frames 2'' are adjusted to any required width as in the former case, such as required to fit any particular size of oven support slides 5 formed on the side walls of the ordinary oven as indicated in Fig. 4 for the former described unit. Fixedly attached to each corner of the grate 3'' is a metal support hook 13, securely attached to the grate bars 11 by welding or otherwise, said hooks being extended below the grate surface and carry attached thereto along opposite sides of the grate, bar slides 14. The bar slides 14 are positioned parallel to each other and so spaced as to receive thereon the turned rim d'' of the pan 1'', and which may be slid thereon to a position directly beneath the broiling grate 3''. The combined oven unit operates for cooking within an oven exactly as heretofore described in the former cases.

While I have shown and described my oven unit in the preferred forms and designs, it is apparent that my device is subject to various modifications in both structure and design without departing from the spirit of my invention, and I claim as my invention the adjustable oven unit as shown and in any other form or design as may be substantially a substitution of parts therein shown.

Having fully described my adjustable oven broiling pan, what I claim as my invention and desire to secure by Letters Patent is:

1. An adjustable oven boiler adapted to fit and engage any size oven rack for supporting said broiler therein, comprising an oven broiling unit formed of a combination oven pan and broiling grate, adjustable side support members adjustably attached to opposite sides of said oven broiling unit, capable of being adjusted and expanded to various pre-determined widths, and means mounted thereon for retaining said adjustable side support members in its various chosen positions.

2. An adjustable oven broiler adapted to fit and engage any size oven rack for supporting said broiler thereon, comprising an oven broiling unit formed of a combination oven pan and broiling grate, said grate being positioned above the oven pan, adjustable side support members slidably mounted on opposite sides of the oven broiling unit capable of side adjustment thereon to various oven widths and engage the oven side wall racks, and means mounted thereon for retaining said adjustable support members in the various adjusted positions.

3. An adjustable oven broiler adapted to fit and engage various sizes of oven racks for supporting said broiler thereon, comprising an oven broiling unit formed of a combination oven pan and broiling grate, said grate being positioned above the oven pan and connected thereto, adjustable side support frames suitable for engaging the oven side wall rack members slidably mounted on opposite sides of the oven broiling unit and positioned thereon in a plane parallel with the broiling unit top surface capable of horizontal adjustment thereon to fit the various oven rack widths, and means mounted thereon for retaining said support frames fixedly in their various adjusted positions.

4. An adjustable oven broiler adapted to fit and engage various sizes of oven support racks for supporting said broiler thereon, comprising an oven unit formed of a combination oven pan and a broiling grate positioned thereabove and connected thereto, slides provided on opposite ends of said oven broiling unit, adjustable side support frames slidably mounted on opposite sides of said oven unit engaging said unit end slides, capable of adjustment therein to various widths in a plane parallel with the oven broiling unit top, for engaging the oven side wall support racks, and means provided on said oven broiling unit and slides for fixedly retaining the side support frames in the various adjusted positions.

5. An adjustable oven broiler adapted to fit and engage various sizes of oven support racks for supporting said broiler thereon, comprising an oven broiling unit formed of a combination oven pan and broiler grate, said grate being positioned above the pan and connected thereto, slide units provided on opposite ends of said oven pan, adjustable side support frames suitable for engaging the oven side wall racks mounted on opposite sides of said oven pan and slidably connected to the pan end slide units, said side support frames being capable of side adjustment thereon in a plane parallel to the pan top surface to various oven support rack widths, and means mounted thereon for fixedly retaining said side support frames in their various adjusted positions.

6. An adjustable oven broiler adapted to fit and engage various sizes of oven side wall support racks for supporting the broiler thereon, comprising an oven broiling unit formed of a combination of an oven pan and a broiling grate, said grate being positioned above and within the pan and connected thereto, the oven pan being formed with a flat rim top having rolled outer edges and open rim corners, U-shaped adjustable side support frames suitable for engaging oven side wall support racks, mounted on opposite sides of said oven pan along the under side of the rim and slidably connected to the rim, capable of side adjustment thereon to various oven rack widths, and means mounted thereon for retaining said side support frames in their various adjusted positions.

7. An adjustable oven broiler adapted to fit and engage various sizes of oven side wall support racks for supporting said broiler thereon, comprising an oven broiling unit formed of a combination of oven pan and broiling grate, said grate being mounted above and within said pan and connected thereto, the oven pan being provided with end slides, U-shaped adjustable side support frames suitable for engaging oven side wall support racks mounted on opposite sides of said oven pan and having the frame ends slidably mounted within said pan end slides capable of sidewise adjustment therein to various oven rack widths, and means mounted on said end slides for fixedly retaining said side support frames in their various adjusted positions.

8. An adjustable oven broiler adapted to fit and engage various sizes of oven side wall support racks for supporting said broiler thereon, comprising an oven broiling unit formed of a combination of an oven pan and broiling grate, said grate being positioned above the pan and connected thereto by projected support members, parallel slide units formed on opposite ends of said broiling grate, adjustable side support frames suitable for engaging the oven side wall support racks mounted on opposite sides of said oven broiling grate and slidably connected to the grate end slide units, said side support frames being capable of sidewise adjustment to various oven rack widths, and means mounted thereon for fixedly retaining said side support frames in their various adjusted positions.

9. An adjustable oven broiling pan adapted to fit and engage various sizes of oven side wall support racks for supporting said pan within an oven, comprising an oven broiling pan provided with slide units along opposite ends thereof, adjustable side support frames mounted on opposite sides of said oven pan and slidably connected to the pan end slide units in a manner capable of sidewise adjustment to various oven rack widths, and means mounted thereon for fixedly retaining said support frames in their various adjusted positions.

10. An adjustable broiling pan adapted for use with a broiling grate and designed to fit and engage various sizes of oven side wall support racks for supporting said broiling pan within an oven comprising an oven pan formed with a flat rim top having rolled rim end slide edges and open corner sections, U-shaped adjustable support frames suitable for engaging the oven side wall racks mounted on opposite sides of the oven pan along the under side of the flat pan rim and slidably connected thereto capable of sidewise adjustment to various oven rack widths, said support frames being fixedly clamped to the pan rim by clamping means mounted thereon.

11. An adjustable oven broiling pan adapted for use with a broiling grate and designed to fit and engage various sizes of oven side wall support racks for supporting said pan within an oven, comprising an oven pan provided with rolled, end slides, U-shaped adjustable side support frames suitable for engaging oven side wall support racks mounted on opposite sides of said oven pan and slidably connected to the pan end slides capable of sidewise adjustment therein to various oven rack widths, and means mounted in the end slides for fixedly retaining the supporting frames in their various adjusted positions.

FRANK N. DIKEMAN.